United States Patent [19]
Newbigging et al.

[11] Patent Number: 5,263,379
[45] Date of Patent: Nov. 23, 1993

[54] AUTOMATIC RANGE SHIFT ARRANGEMENT

[75] Inventors: Ian M. Newbigging, Bolton; David E. Gibbons, Chorley, both of England

[73] Assignee: Eaton Corporation, Cleveland, Ohio

[21] Appl. No.: 986,199

[22] Filed: Dec. 7, 1992

[30] Foreign Application Priority Data

Dec. 14, 1991 [GB] United Kingdom ............... 9126586
Jun. 11, 1992 [GB] United Kingdom ............... 9212409

[51] Int. Cl.⁵ ............................................. F16H 5/42
[52] U.S. Cl. ................................. 74/336 R; 192/3.63
[58] Field of Search ................ 74/336 R; 192/3.63

[56] References Cited

U.S. PATENT DOCUMENTS

| | | | |
|---|---|---|---|
| 2,293,758 | 8/1942 | Pescara | 192/3.63 |
| 2,332,341 | 10/1943 | Price et al. | 192/3.63 X |
| 2,445,716 | 7/1948 | Sternberg | 192/3.63 X |
| 2,703,496 | 3/1955 | Massorotti | 192/3.63 |
| 4,527,447 | 7/1985 | Richards | 74/336 R X |
| 4,722,248 | 2/1988 | Brann | 74/336 R |
| 4,974,468 | 12/1990 | Reynolds et al. | 74/477 |
| 4,974,474 | 12/1990 | Newbigging | 74/867 |
| 5,054,591 | 10/1991 | Brann | 192/3.63 |
| 5,193,410 | 3/1993 | Stine et al. | 74/336 R |

Primary Examiner—Dirk Wright
Attorney, Agent, or Firm—H. D. Gordon

[57] ABSTRACT

An automatic range shift control system for automatically controlling range section (14) shifting in an otherwise manually shifted range type compound transmission (10) is provided. A sensor (100) senses a value indicative of vehicle ground speed and provides a signal (100A) which is compared to a reference value. If the signal is greater than the reference, an actuator (96) is urged to engage the high speed range ratio and if the signal is less than the reference, the actuator is urged to engage the low speed range ratio.

29 Claims, 5 Drawing Sheets

AUTOMATIC RANGE SHIFT ARRANGEMENT

BACKGROUND OF THE INVENTION

1. Related Applications

This application claims priority from British applications GB 9126586.8 filed Dec. 14, 1991 and GB 9212409.8 filed Jun. 11, 1992, both assigned to the assignee of this application, Eaton Corporation.

2. Field of the Invention

The present invention relates to a range shift arrangement for a range type compound transmission and, more particularly, to an automatic range shift arrangement for an otherwise manually shifted range type compound transmission.

3. Description of the Prior Art

Compound transmissions of the range or combined range/splitter type are well known in the prior art as may be seen by reference to U.S. Pat. Nos. 3,105,395; 3,138,965; 3,171,300; 3,283,613 and 4,754,665, the disclosures of which are hereby incorporated by reference.

Briefly, such transmissions typically comprise a multiple speed main transmission section connected in series with a range type auxiliary section wherein the range step is greater than the total ratio coverage of the main transmission section. Assignee's well known RT/RTO 11609 and RT/RTO 11610 "Roadranger" transmissions are examples of "(4+1)×(2)", nine speed and "(5)×(2)" ten speed heavy duty range type transmissions.

In such transmissions, the main section is typically shifted by means of a shift bar housing assembly controlled by a manually operated shift lever or the like and the auxiliary range section is shifted by means of button or switch, usually manually operated, which controls a remote slave valve/actuator mechanism. As the range section often utilizes synchronized jaw clutches, to provide acceptable shift quality and prevent undue wear and/or damage to the range section synchronized jaw clutches, a range shift should be initiated, and preferably completed, while the main transmission section is in neutral.

In view of the above, the prior art compound range type transmissions usually include control systems, usually a pneumatic control system including interlock devices, which allowed a range shift to be preselected by use of a selector button or switch at a master control valve but not initiated until the main transmission section is shifted to, or at least towards, the neutral condition. Examples of such transmissions and the control systems therefor may be seen by reference to U.S. Pat. Nos. 2,654,268; 3,138,965; 4,060,005 and 4,974,474, the disclosures of which are hereby incorporated by reference. Range type transmissions utilizing mechanical interlock devices, of both the rigid and the resilient type, may be seen by reference to U.S. Pat. Nos. 4,974,474; 4,944,197 and 4,296,642, the disclosures of which are hereby incorporated by reference.

The prior art manually controlled range type compound transmissions were usually of the "repeat H" type wherein the range shift was selected or preselected by the operator, usually by a button/switch on the shift lever, or of the "double H" type wherein a sensor sensed shifting between "H" patterns to select a range shift. So-called "double H" type controls are well known in the prior art as may be seen by reference to U.S. Pat. Nos. 4,633,725 and 4,275,612, the disclosures of which are hereby incorporated by reference.

While the prior art manually shifted range type compound transmissions are very successful, especially for use in heavy duty vehicles, they are not totally satisfactory as those equipped with "repeat H" type controls require manual selection of the range shift and/or may inadvertently be shifted into an inappropriate range wherein under or over speeding of the engine may occur and those equipped with "double H" type controls may require an excessive amount of shift lever transverse space and/or may be awkward to shift.

SUMMARY OF THE INVENTION

In accordance with the present invention, the drawbacks of the prior art are minimized or overcome by the provision of an automatic range shift arrangement for an otherwise manually shifted range type compound transmission having a "repeat H" type control.

The above is accomplished by providing controls which receive an input signal indicative of vehicle ground speed, such as transmission output shaft speed, and compare this signal to a predetermined reference value to determine if a slave type range shift actuator should be commanded to shift into high (usually direct) or low range and, if required, issues command signals to the actuator which will preselect required range shifts to be performed during the next manual shift through neutral.

Preferably, the range shift actuator assembly will include interlocks to prevent range shift initiation until a shift into main section neutral occurs and/or will include a manual override allowing manual selection of a range shift into high range at vehicle speeds lower than the reference vehicle speed. Preferably, the actuator assembly is spring biased to cause the range section to remain in or shift into the range high speed ratio in the event of a failure in the control or actuating medium to prevent potential damage to the vehicle engine and/or transmission.

Accordingly, it is an object of the present invention to provide a new and improved automatic control arrangement for range shifting of a range type compound transmission have an otherwise manual "repeat H" type control.

This and other objects and advantages of the present invention will become apparent from a reading of the detailed description of the preferred embodiment taken in connection with the attached drawings.

DESCRIPTION OF THE PREFERRED EMBODIMENT

Figure 1:
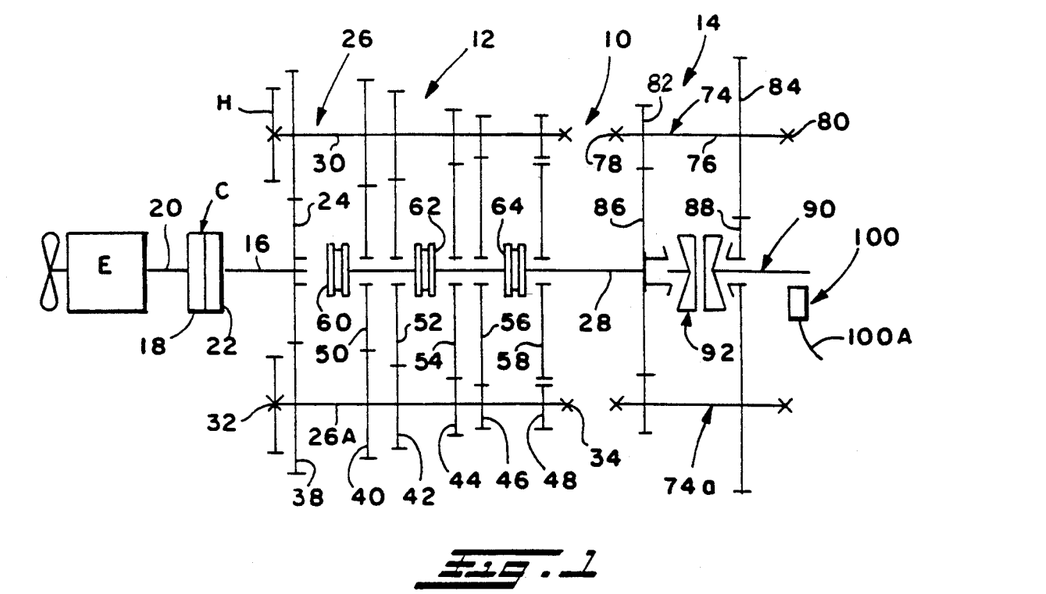
FIG. 1 is a schematic illustration of a compound transmission having a range type auxiliary section and utilizing the automatic range shift control system of the present invention.

Certain terminology will be used in the following description for convenience in reference only and will not be limiting. The words "upwardly", "downwardly", "rightwardly", and "leftwardly" will designate directions in the drawings to which reference is made. The words "forward" and "rearward", will refer, respectively, to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and a relatively large capacity friction means are utilized with the clutch members and are sufficient, upon initiation of a clutch engagement, to cause the clutch members and all members rotating therewith to rotate and substantially synchronous speed.

Figure 1A:
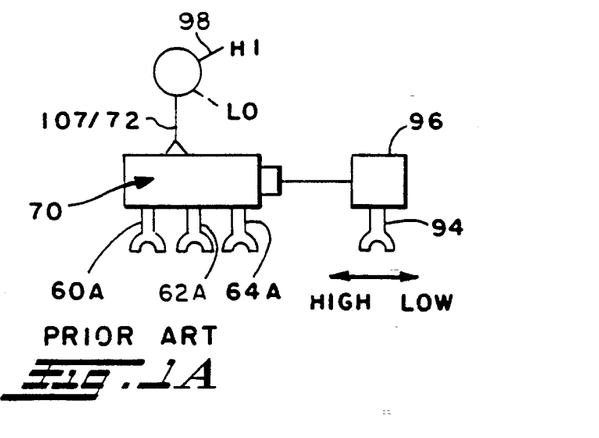
FIG. 1A is a schematic illustration of the prior art shifting mechanisms of the transmission of FIG. 1.
Figure 1B:
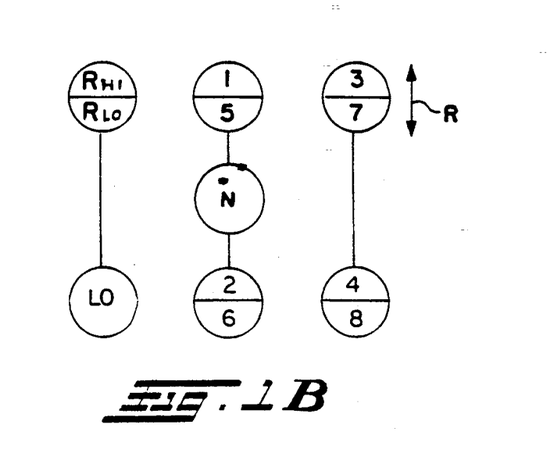
FIG. 1B is a schematic illustration of a repeat H type shift pattern for the transmission of FIG. 1.

Referring to FIGS. 1, 1A and 1B, a range type compound transmission 10 is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, jaw clutch collars 60, 62 and 64 are axially positioned by means of shift forks 60A, 62A and 64A, respectively, associated with the manually controlled shift bar housing assembly 70, as well known in the prior art. Clutch collars 60, 62 and 64 may be of the well known acting synchronized or nonsynchronized double acting jaw clutch type.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of a shift lever 72. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with range/output gear 86 which is rotationally fixed to mainshaft 28 while auxiliary section countershaft gears 84 are constantly meshed with output gear 88.

A two-position synchronized jaw clutch assembly 92, which is axially positioned by means of shift fork 94 and the range section shifting actuator assembly 96, is provided for clutching either gear 88 to output shaft 90 for low range operation or gear 86 to output shaft 90 for direct or high range operation of the compound transmission 10. The shift "repeat H" type pattern for compound range type transmission 10 is schematically illustrated in FIG. 1B.

Although the range type auxiliary section 14 is illustrated as a two-speed section utilizing spur or helical type gearing, it is understood that the present invention is also applicable to range type transmissions utilizing combined splitter/range type auxiliary sections, having three or more selectable range ratios and/or utilizing planetary type gearing. Also, as indicated above, any one or more of clutches 60, 62 or 64 may be of the synchronized jaw clutch type and transmission sections 12 and/or 14 may be of the single countershaft type.

In the prior art, see FIG. 1A, selection of low or high range operation of the transmission 10 is by means of an operator actuated switch or button 98 which was usually located at the shift lever 72.

The present invention eliminates the need for switch or button 98 and the need for the vehicle operator to manually operate same. The electrically controlled pneumatic air control system of the present invention for automatic range shifting in a repeat H type shift control may be appreciated by reference to FIGS. 2-4.

Figure 2:
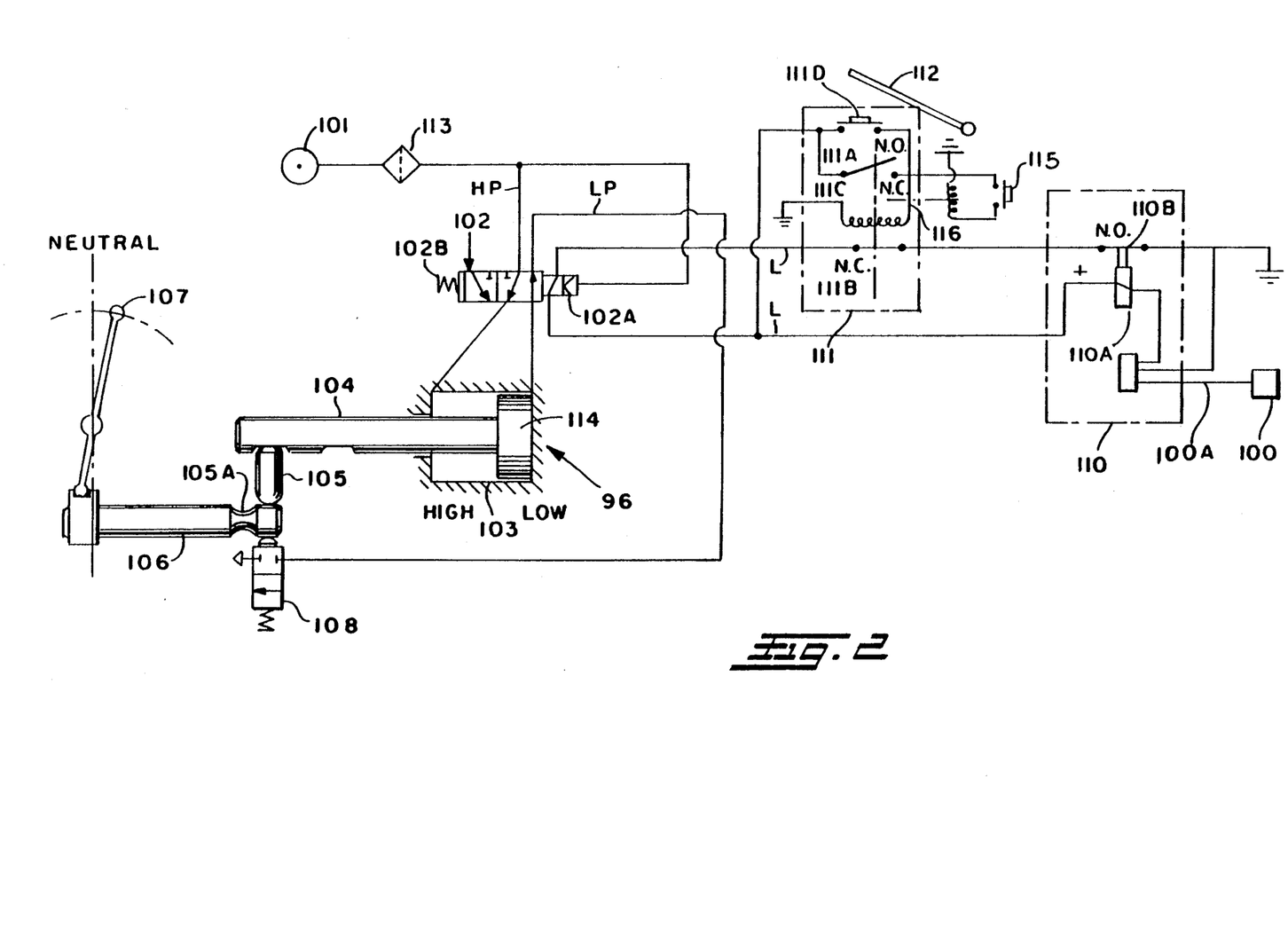
FIGS. 2–4 are schematic block diagrams showing the automatic range shifting system of the present invention in various conditions of range shifting.
Figure 3:
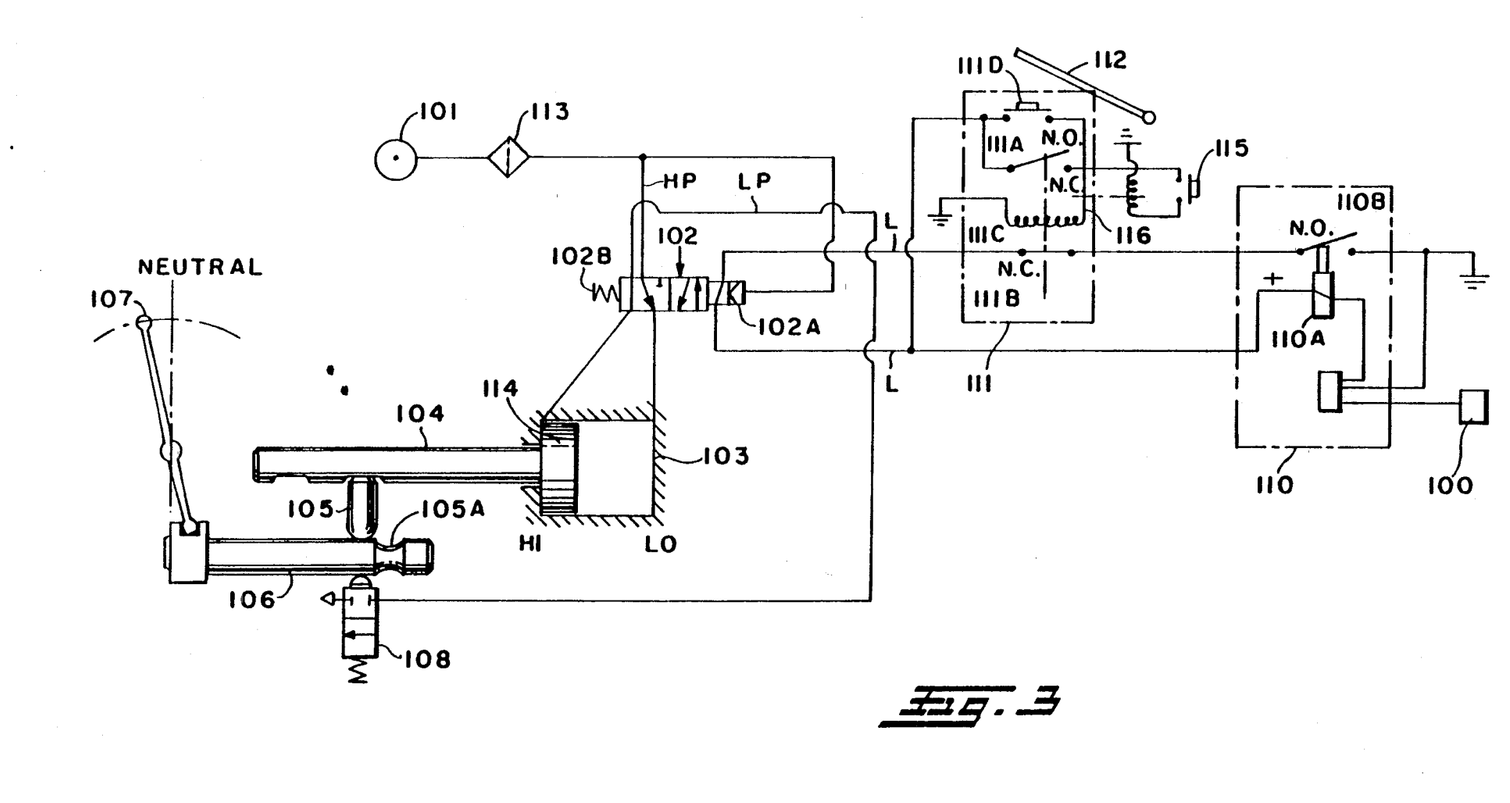
Figure 4:
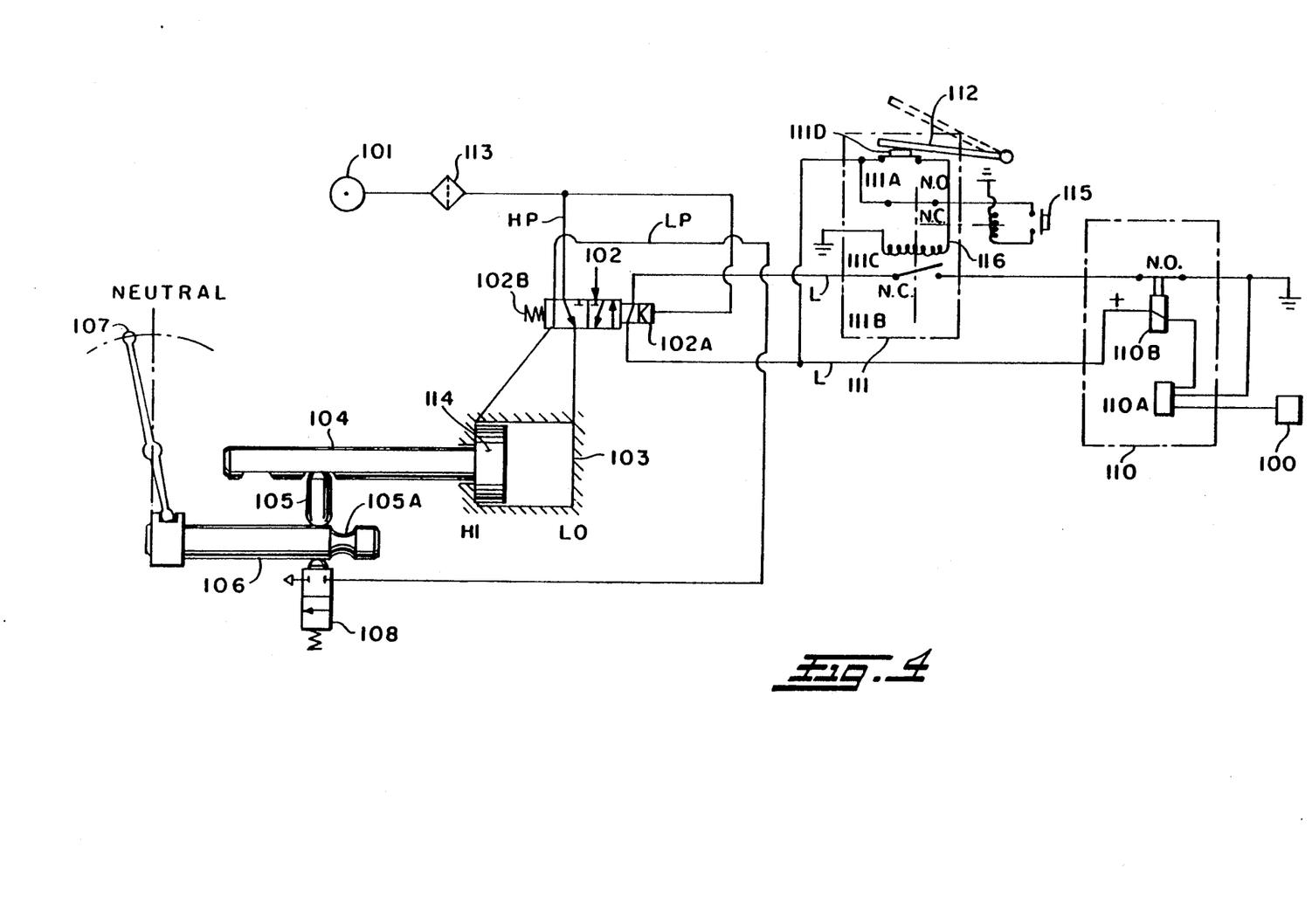

Transmission 10 is provided with a rotational speed sensor 100 for sensing the rotational speed of output shaft 90 and for providing an output signal 100A indicative thereof. As is well known, the rotational speed of output shaft 90 is indicative of the ground speed of the vehicle in which transmission 10 is installed.

It is known to arrange a range change automatic inhibiting control device in a manual range changing arrangement to inhibit range downshifts above a predetermined vehicle speed. Manual range shifting is typically by a pneumatic or electrical switch on a gear changing lever or knob used for shifting the main transmission section within the ranges. The known automatically controlled inhibitor may be electrically and/or pneumatically controllable in response to a speed sensor or the like and is automatically responsive to vehicle speed. The present invention proposes to use such a known device, automatically to inhibit, but also automatically to introduce range shifts, and, by manual override controls to the same device, to give a measure of driver control to range upshifting and/or downshifting.

The shifts will henceforth be referred to in terms of range shifts, e.g. between a top (usually direct drive) range of four ratios manually selected and a bottom (usually reduction) range of four manually selected ratios. Only the range shifting is presently envisaged as normally automatic, but overrideable, by the invention.

As is known in the prior art, see for example above-mentioned U.S. Pat. No. 4,974,474, a two-position piston 114 carrying a shaft 104 on which the range shift fork 94 is mounted is slidably received in a cylinder 103. A two-position four-way solenoid 102A controlled control valve 102 is used to selectively pressurize and exhaust the opposed chambers of the cylinder 103. For failsafe purposes to be described below, a spring 102B biases the valve 102 to a position wherein the piston will cause the high range to be engaged.

At least one electrical line (L) to the range change valve 102 will power the solenoid 102A only when a normally open, speed sensor 100 controlled, contact 110B of the invention in the line is closed, and, preferably when a normally closed contact 111B in the line has not been opened by some manually operated device 112 presently preferred to be the normal clutch pedal, when depressed to a selectable position beyond that normally required to disengage the clutch (at which point a microswitch 111D may be closed). Many drivers are used to this clutch deep depression or overtravel type of control, which is frequently used on upshift brakes.

A further optional refinement is that the brake pedal may operate a further control 115 energizing the power line (L). It could be a shunt of the normally closed clutch-operated contact 111B when opened by the clutch; or it could be a device 111 operating said normally closed contact 111B could be itself interfered with electrically, by energizing a normally closed further contact 116, in the clutch operated device 111 such that the series or line contact 111B cannot be opened.

In order for these operations to operate fail-safe via a common line L,L, the range change control valve 102 should be normally driven (e.g. spring biased) to high range position thereof, and solenoid driven (via the line LL) to the low range position thereof. Electrical failure should the allow only upshifts into the high range to be adopted. A fail-safe is considered to be achieved thereby because too high a range can only cause the engine and transmission to under-rev (which is relatively safe), whereas too low a range can much more seriously cause undesirable over-revving.

The clutch override control, 111, 111D, should be able to give a prolonged effect on the opening of the line contact 111B, i.e. the contact should be kept open after the clutch pedal 112 and microswitch initiator device 111D have been operated, for some 15 seconds, by way of example. This is because the line must then be kept open until the vehicle has accelerated to a speed making or allowing the vehicle speed energized contact 110B to open; otherwise the range section will reshift to the low speed ratio thereof.

The range control, valve 102 may allow high and low pressure lines (HP, LP) to be applied either side of the range-conditioning two-way piston 114 to drive a range-change shaft 104. Shaft 104 may have two depressions allowing a range-shift inhibitor pin 105 to prevent range shifting except when the manual selector 107 is at a neutral position. Main section neutral will not only allow the pin 105 to release the range shaft rod 106, but valve 108 will also allow the low pressure conduit or source LP (usually a vent to atmosphere) only to be effective or enabled while the range is being changed during said neutral condition (e.g. during passage of a waist 10A on selector 106 opposite the pin 105). Devices of this type may be seen by reference to abovementioned U.S. Pat. No. 4,974,474 and U.S. Pat. No. 4,974,468, the disclosure of which is incorporated herein by reference.

The pneumatic system comprises the solenoid range control valve 102 which is supplied compressed air from the vehicle air system 101 via a filter and/or regulator 113. The compressed air flows through the range control valve 102 to the range cylinder 103 where it tries to move the range shaft 104/range piston 114 assembly in one or the other direction between the high and low range positions thereof. An interlock pin 105 between the range shaft 104 and main section selector shaft 106 prevents in known manner simultaneous movement of both shafts. The selector shaft 106 is controlled manually by the gear lever 107, and the range shaft 104 cannot move until the selector shaft 106 moves to/through the neutral position, allowing the interlock pin 105 to drop into a waist 105A, and thereby allowing the range shaft 104 to move. At the same time the exhaust control valve 108 is opened to allow air to pass from the range cylinder 103 to atmosphere. The direction in which the range shaft 104 is biased to move is determined by the position of the range control valve 102 and whether or not it has been activated leftward by the solenoid 102A or rightward by the spring 102B on the valve.

The electronic system comprises a trigger switch 110 that receives a signal 100A from the vehicle speed sensor 100 and which cuts out de-energized when the vehicle achieves a preset and predetermined ground speed. Below this speed a solenoid 110A in the trigger switch is energized, causing a normal open gate 110B to close and thereby completing one circuit towards the solenoid 102A of valve 102. Above this speed the solenoid 110A is not energized and the circuit remains always incomplete. A relay timer switch 111 is fitted under the driver's clutch pedal 112 and is manually activated (when required) e.g. at the extreme bottom end of the clutch pedal stroke, further than the normal declutching depression. The purpose of relay timer switch 111 is to energize the coil 111C which then opens (for a preset time) the normally closed closed gate 111B and overrides/cuts out the signal from the trigger switch 11'0 even when the latter is triggered. When the timer relay switch 111 is activated e.g. by closure of a microswitch 111D, it also supplies power to a microswitch 115 under the brake pedal or pressure switch in the brake line, by closing a normally open contact 111A to energize the microswitch. If the brake pedal is then depressed after an activation of the timer relay switch 111, the microswitch 115 under the brake pedal, or the pressure switch in the brake line, opens the normally closed gate 116 cancelling the relay timer switch 111 and allowing contact 111B to re-close.

FIG. 2 shows the transmission in low range, the solenoid 110A in the trigger switch 110 is being fed a signal from the vehicle speed sensor control 110 and is holding the normally open gate 110B closed, thereby creating a circuit and energizing the solenoid 102A in the range control valve 102 which is now keeping the transmission in low range. If, for any reason, the electric signal to the solenoid 102A of valve 102 fails when the system is in low range, the valve will automatically default to high range position by virtue of the spring 102B in the range control valve 102. This pre-energizes the opposite side of cylinder 103, causing a default to high range when neutral is next passed through by a manual shift action.

The system is designed to fail to high range to ensure that there is no overspeeding of the engine and thereby prevent damage occurring to both the engine and transmission. The vehicle ground speed at which the signal from the vehicle speed sensor 100 via the trigger switch 110 energizes the solenoid 110A is predetermined, according to the vehicle and driveline configuration, and is preferably based on a percentage of the governed speed of the highest gear in low range. The transmission will remain in low range until this vehicle speed is achieved, when the vehicle speed signal or voltage will cut out, de-energize the solenoid 110A in the trigger switch 110 and the gate 110B will open. This will in turn de-energize the solenoid 102A in the range control valve 102 and the spring 102B will cause the valve 102 to go to its high range initiating position. The piston 114 will thus move to the high range ratio position thereof the next time the gear lever 107 and selector shaft 106 move to/through the neutral position.

FIG. 3 shows the range control system with the transmission 10 being driven, or having been driven, into high range. The range control valve 102 is being held in the high range position by the spring 102B in the valve and will remain so until the vehicle speed slows to the predetermined speed when the trigger switch 110 will activate the solenoid 110A and close the gate 110B completing the circuit. Thereafter, the next time the gear lever 107 and selector shaft move to/through the neutral position the solenoid 102A on the range control valve 102 (which has now been energized) will have preselected low range with valve 102 in the low range position and air will pass from a high pressure conduit HP to the left hand side (instead of the right side) of the range cylinder 103, moving the range cylinder piston 114 range shaft 104 assembly rightwards to the low position and exhaust conduit LP and the exhaust control valve 108.

FIG. 4 shows the relay timer switch 111 being activated by a depression further than the normal declutching depression of pedal 112. The driver has thus signalled his desire that the automatic range change is to be overridden. This will usually occur when:

a) the driver wishes to change from low to high range (when he is in the highest gear in low range), and keep the engine/transmission at an optimum for lower revs/fuel consumption; or b) the driver wishes to start the vehicle in high range e.g. because the vehicle is unladen or partially laden; or c) the driver wishes to skip shift to high range from a low range gear less than the highest (i.e. a skip shift from 3rd speed to 5th or 6th speed).

When the clutch pedal 112 is depressed to an overtravel position, i.e. towards or to the end of its stroke, the microswitch 111D on the relay timer switch 111 is activated. The coil 111C in the timer 111 is energized and opens the normal closed gate 111B cutting out the signal from the trigger switch 110 solenoid 10A, thus causing the range control valve solenoid 102A to de-energize and the range control valve solenoid 102 to revert to the high range position thereof. The range piston 114, shaft 104 is now pre-energized. The next time the gear lever 107 and selector shaft 106 move to/through the neutral position, the high range position will be achieved. The time duration setting of the relay timer switch 111 is determined by the configuration of the vehicle and driveline and is designed to allow the vehicle to reach the speed at which the signal from the trigger switch 110 would cause the solenoid 110A to normally cut out. It may, for example, be 15 seconds in one embodiment. If within this time setting the vehicle does not achieve this speed or for any reason the driver decides not to engage high range, the system and transmission will remain in/return to low range when the relay timer 111 cuts out.

Many drivers of heavy vehicles are accustomed to a control needing an extra deep depressing of the clutch pedal, since such vehicles often have an upshift brake operable in this way. Therefore, the aforementioned activation of relay timer switch 111 will be for many a very readily assimilated routine.

In a preferred embodiment, if the driver depresses the brake pedal after his abnormal depression of the clutch activating the relay timer switch 111, as described just above, a microswitch 115 under the brake pedal or pressure switch in the brake line will cancel the relay timer switch 111 via a contact 116 and the transmissin wil remain in low range until the relay timer switch 111 is reactivated (opening contact 111B) or the trigger switch 110 is deactivated by the vehicle speed sensor, releasing normally open contact 10B.

The transmission is therefore able to change from low to high range and back again automatically or via the foot-pedals, using a "repeat H" gearshift pattern (see FIG. 1B), without the need for a hand control valve to pre-select either range, and is protected from any damage resulting from engine overspeeding by being designed to fail to high range, especially on failure of electrical.

Figure 5:
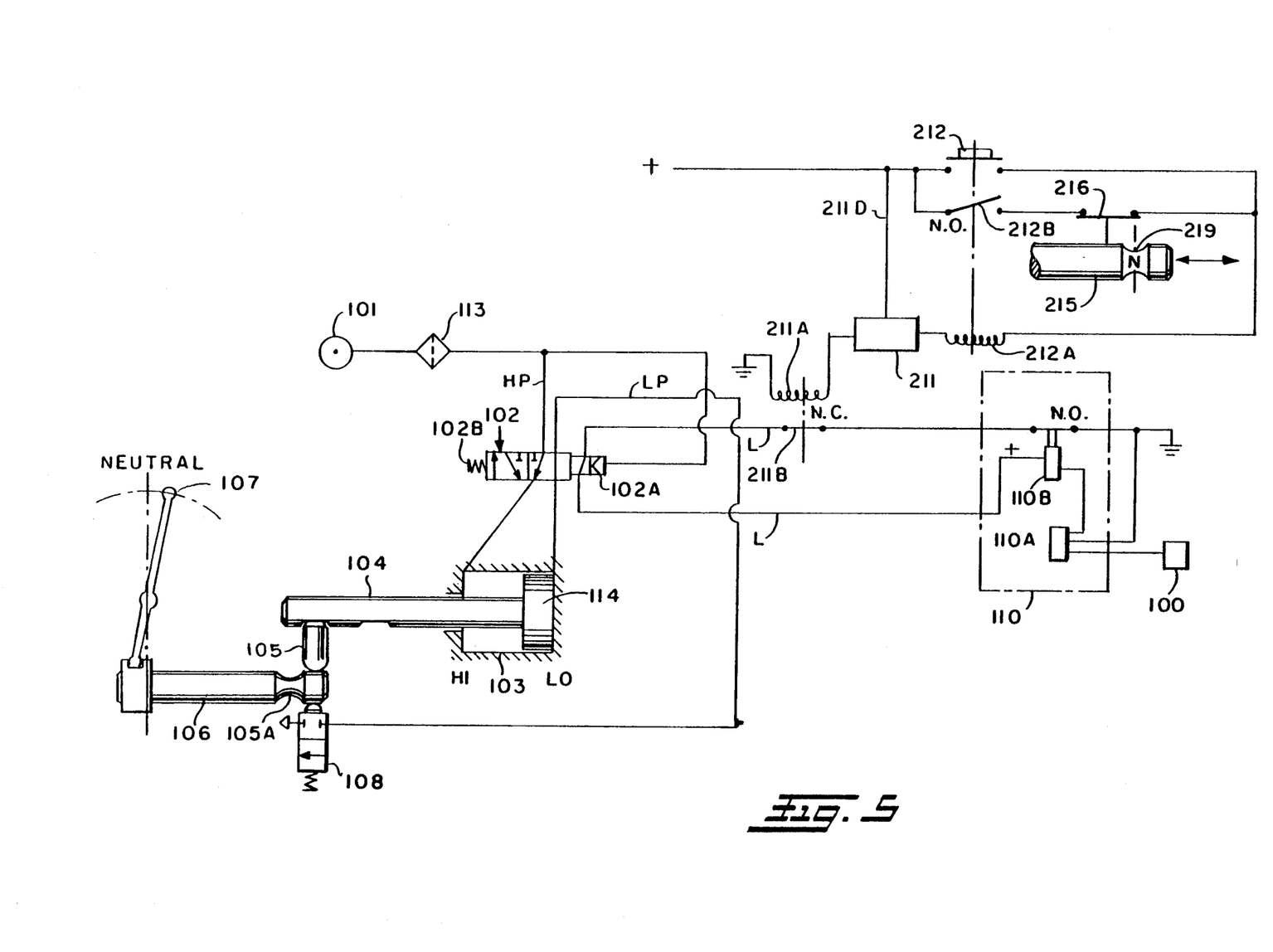
FIG. 5 is a schematic block diagram, similar to FIGS. 2–4, of an alternate embodiment of the present invention.

According to embodiment of FIG. 5, a special cancellation of the overriding is not provided, since sometimes is it not found necessary or cost-effective. Also, a separate manual touch-button type selection of override to upshift is provided. This is especially useful if a clutch pedal actuated upshift brake or the like is utilized on the vehicle. Accordingly, the manual control is specific, i.e. not an extra depression of the main clutch pedal. This touch-button 212 activities a relay coil 212A which operates a hold contact a hold contact also a delay unit 211. The latter then activates a second relay coil 211A for a finite time delay, the need for which delay is explained hereinbelow. The second relay coil 211A opens a normally closed contact 211B in the electrical connection to a range shifter valve which, when not energized, defaults to select the higher of the two range section gear ratios. The delay unit 211 is selected to maintain open the normally closed contact long enough to allow time for the upshift manual gear change.

Another optional refinement is for the overriding relay 212A initiated by the push-button to be switched out when the range box passes through its neutral, e.g. when a waist 219 in a shifting shaft 215 opens a normally closed contact 216 long enough to de-energize the overriding relay 212A. As aforesaid, the delay unit 211 must have a long enough delay value capacity to allow not only completion of the upshift.

Referring to FIG. 5, lines, L,L, supply electricity to a solenoid 102A to drive the shifter 103 to the low range position as described above, automatically whenever the system is in high range but a vehicle speed sensor 100 reads low and closes a series contact 110B in lines L,L,. When lines L,L define an open circuit, a return spring 1-2B makes the solenoid valve default to its high range position. The present embodiment proposes a device for manually overriding the low range condition, usually as aforesaid because the driver thinks that high range would better suit current operational conditions. The normally open contact 110B will be currently closed in response to the vehicle speed sensors relatively low speed reading, but the overriding is accomplished in this embodiment by opening a normally closed contact 211B in series with contact 110B in lines L,L.

Accordingly there is provided a push-button contact 212 which energizes a first relay 212A, a second relay 211A and a delay or hold unit 211. Relay 212A is energized by manual control 212, maintained ON by its own sustain contact 212B, and de-energized on an operating shaft 215 of the range box (not shown) passing through neutral. For instance, thereon, a waist portion 219 of shaft 215 may be sensed at a point, to open a normally closed contact 216 in series with sustain contact 212B.

The second relay 211A has thus been energized via the push button and first relay 212A, sustained ON at first by contact 212B, and then kept energized via a direct line 211D for the duration of, for example, two seconds by unit 211, even after neutral sensing contact 216 has opened. This gives time to enable, and engage high range.

High range is actually engaged or more accurately enabled to be engaged in this embodiment by second relay 211A opening the series contact 211B in lines L,L, for the two seconds set by unit 211 (engagement then follows on lever 107 passing neutral). If the sensed vehicle speed does not reach the reference vehicle speed within the two seconds, contact 211B closes, line L,L is again completed, and low range is re-engaged (so that the cancelling button 115 of the embodiment of FIGS. 2–4 may not be required).

Accordingly, it may be seen that a new and improved pneumatic control system for automatically controlling the range shifting of an otherwise manually shifted range type compound transmission has been provided.

While the preferred embodiment of the present invention has been described with a certain degree of particularity, it is understood that various modification, rearrangement and/or substitution of the components thereof is possible without departing from the spirit and the scope of the invention as hereinafter claimed.

We claim:

1. A range shift control system for a vehicular compound transmission (10) comprising a multiple speed main transmission section (12) connected in series with a multiple speed auxiliary transmission section (14), said main transmission section having a selectable neutral position and said auxiliary transmission section having a high speed range ratio and a low speed range ratio, operator actuated selection means (107) allowing selection of a selected main transmission section ratio or a main transmission section neutral position and an auxiliary shifting mechanism (96) for shifting said auxiliary transmission section from one of said auxiliary section range speed ratios to another of said auxiliary section range speed ratios, said control system characterized by:

means (100) for sensing a value indicative of vehicle ground speed and for providing a signal (100A) indicative thereof;

control means (102, 110, 111, 115) for controlling the operation of said auxiliary shifting mechanism, said control means including means for receiving said signal (100A) indicative of vehicle ground speed and comparing said signal to a predetermined reference value and, (i) if said signal exceeds said reference value automatically causing said shifting mechanism to urge a shift into said high speed range ratio, and, if said signal is less than said reference value, automatically causing said shifting mechanism to urge a shift into said low speed range ratio.

2. The range shift control system of claim 1 wherein said shifting mechanism includes interlock means (104, 105, 105A) for preventing shifting of said auxiliary section unless said main transmission section is shifted to or toward neutral.

3. The range shift control system of claim 1 wherein said operator actuated selection means is of the repeat pattern (FIG. 1B) type.

4. The range section control system of claims 1, 2 or 3 wherein said control means includes a control member 102 having a first position for urging an auxiliary transmission section shift into the high speed range ratio and a second position, displaced from said first position, for urging an auxiliary section shift into the low speed range ratio, said member resiliently biased towards said first position thereof.

5. The range section of claims 1, 2 or 3 wherein said control means includes a manually operable override device (112, 212) allowing a vehicle operator to manually select an auciliary section shift into said high speed range ratio regardless of the value of said signal.

6. The range section of claim 4 wherein said control means includes a manually operable override device (112, 212) allowing a vehicle operator to manually select an auxiliary section shift into the high speed range ratio regardless of the value of said signal.

7. The range control system of claim 5 wherein said override device is effective for only a limited period of time.

8. The range control system of claim 7 wherein said limited period of time is about fifteen seconds.

9. The range control system of claim 6 wherein said override device is effective for only a limited period of time.

10. The range control system of claim 9 wherein said limited period of time is about fifteen seconds.

11. The range shift control of claims 1, 2 or 3 wherein said value indicative of vehicle grounds speed is the rotational speed of the transmission output shaft (90).

12. The range shift control of claim 4 wherein said value indicative of vehicle grounds speed is the rotational speed of the transmission output shaft (90).

13. The range shift control of claim 5 wherein said value indicative of vehicle grounds speed is the rotational speed of the transmission output shaft (90).

14. The range shift control of claim 6 wherein said value indicative of vehicle grounds speed is the rotational speed of the transmission output shaft (90).

15. A pressurized fluid operated range shift control system for a compound transmission (10) comprising a multiple speed main transmission section (12) connected in series with a multiple speed auxiliary transmission section (14), said main transmission section having a selectable neutral position and said auxiliary transmission section shiftable to a selected one of a high speed and a low speed range section speed ratios, operator actuated selection means (107) allowing selection of a selected main transmission section ratio or said main transmission section neutral position, and an auxiliary shifting mechanism (96) comprising a fluid actuated actuator piston (114) slideably and sealingly received in an actuator cylinder (103) defining a first and second cylinder chamber, shifting from one of said auxiliary section range speed ratios to the other of said auxiliary section range speed ratios requiring pressurization of a selected one of said cylinder chambers, said control system characterized by:
  means (100) for sensing a value indicative of vehicle ground speed and for providing a signal (100A) indicative thereof;
  control valve means (102), independent of the neutral/not neutral condition of the main transmission section, to connect a selected one of said cylinder chambers to a source of pressurized fluid, said valve means having a first position for causing said actuator piston to urge engagement of said high speed range ratio and a second position for causing said actuator piston to urge engagement of said low speed range ratio;
  control means (110, 111, 112, 115) for controlling the operation of said control valve means (102), said control means including means for receiving said signal (100A) indicative of vehicle speed and comparing said signal to a predetermined reference value and, (i) if said signal exceeds said reference value automatically causing said valve means to assume said first position thereof, and (ii) if said signal is less than said reference value, automatically causing said valve means to assume said second position thereof.

16. The range shift control system of claim 15 wherein said shifting mechanism includes interlock means (104, 105, 105A) for preventing shifting of said auxiliary section unless said main transmission section is shifted to or toward neutral.

17. The range shift control system of claim 15 wherein said operator actuated selection means is of the repeat pattern (FIG. 1B) type.

18. The range shift control system of claims 16 wherein said operator actuated selection means is of the repeat pattern (FIG. 1B) type.

19. The range shift control system of claims 15, 16, 17 or 18 wherein said control valve means is a solenoid (102A) controlled valve resiliently (102B) biased to the first position thereof.

20. The range section control system of claims 15, 16, 17 or 18 wherein said control means includes a manually operable override device (112, 212) allowing a vehicle operator to manually select a shift into the high speed range ratio regardless of the value of said signal.

21. The range section control system of claim 19 wherein said control means includes a manually operable override device (112, 212) allowing a vehicle operator to manually select an auxiliary section shift into the high speed range ratio regardless of the value of said signal.

22. The range control system of claim 20 wherein said override device is effective for only a limited period of time.

23. The range control system of claim 21 wherein said override device is effective for only a limited period of time.

24. The range control system of claim 22 wherein said limited period of time is about fifteen seconds.

25. The range shift control of claims 15, 16, 17 or 18 wherein said value indicative of vehicle grounds speed is the rotational speed of the transmission output shaft (90).

26. The control system of claims 15, 16, 17 or 18 wherein said range auxiliary transmission section is engageable by means of synchronized jaw clutch devices (92).

27. A method for controlling range shifting for a vehicular compound transmission (10) comprising a multiple speed main transmission section (12) connected in series with a multiple speed auxiliary transmission section (14), said main transmission section having a selectable neutral position and said auxiliary transmission section having a high speed range ratio and a low speed range ratio, operator actuated selection means (107) allowing selection of a selected main transmission section ratio or a main transmission section neutral position and an auxiliary shifting mechanism (96) for shifting said auxiliary transmission section from one of said auxiliary section range speed ratios to another of said auxiliary section range speed ratios, said method characterized by:
  sensing (100) a value indicative of vehicle ground speed and providing a signal (100A) indicative thereof;
  receiving said signal (100A) indicative of vehicle ground speed and comparing said signal to a predetermined reference value and, (i) if said signal exceeds said reference value automatically causing said shifting mechanism to urge a shift into said high speed range ratio, and, if said signal is less than said reference value, automatically causing said shifting mechanism to urge a shift into said low speed range ratio.

28. The method of claim 27 wherein said operator actuated selection means is of the repeat pattern (FIG. 1B) type.

29. The method of claims 27 or 28 wherein said method includes providing a manually operable override device (112, 212) allowing a vehicle operator to manually select a shift into said high speed range ratio regardless of the value of said signal.

* * * * *